Oct. 5, 1965   J. T. MARTIN   3,210,193
METHOD OF DEEP-FAT COOKING COMESTIBLES
Filed Dec. 18, 1962

INVENTOR
JOSEPH T. MARTIN
BY
ATTORNEYS

3,210,193
METHOD OF DEEP-FAT COOKING COMESTIBLES
Joseph T. Martin, Tampa, Fla., assignor, by mesne assignments, to Food Research & Equipment Co., Tampa, Fla., a corporation of Florida
Filed Dec. 18, 1962, Ser. No. 245,626
7 Claims. (Cl. 99—1)

This invention relates to the processing of comestibles and more particularly to deep fat frying thereof by restaurants, institutions and the like, as distinguished from continuous-load deep fat frying methods of processing plants.

In the deep fat frying of comestibles, there are four important factors which should be considered, namely, filtering of the used oil or fat, circulation of the oil or fat (hereinafter referred to as "cooking medium" or "cooking media") through the apparatus, stabilization of the cooking medium, and temperature recovery thereof when comestibles at temperatures below the proper temperature of the cooking medium are introduced thereto.

It is well known that nutritional and chemical changes occur in heated deep fat cooking media (see "Nutritional and Chemical Changes Occurring in Heated Fats: a Review," by Edward G. Perkins, in the publication "Food Technology," October 1960, pages 508–514) and that prolonged heating and inadequate filtering of deep-fat cooking media damage the same.

An important object of this invention is to provide steps which will insure effective filtration of the cooking medium flowing from an average-sized cooking pot in restaurant use, for example, whereby complete filtration of the cooking medium will be effected within, for example, four minutes of operation of my system and my method, and without the use of so-called filter aid. Moreover, the steps will obviate heat damage, since the cooking medium will never be overheated, even for a short period, as will be described hereinafter.

A serious problem in connection with deep-fat frying has been the proper cooking of the comestibles supported within the central portion of the conventional cooking basket. It is known that comestibles near the walls, bottom and mouth of the basket may be properly cooked, while those adjacent the central portion thereof are not fully cooked.

A further important object of this invention is to provide a cooking medium circulatory system or method carried out within the deep-fat cooking pot which will circulate the cooking medium through the basket and through the interstices between the comestible portions within the basket, including those within the central portion thereof.

Not only is this circulatory system or method beneficial to the proper cooking of the comestibles but it has another function, since it sweeps foreign matter, such as loose crumbs, fragments of comestibles and the like from the interstices mentioned and from the inner surface of the bottom of the cooking pot, to the cooking medium and foreign matter exit which is in communication with a filter adapted to filter out such foreign matter.

It is also generally well known that antioxidants are usually added, at the refinery producing the deep fat cooking mediums so as to protect the mediums mostly for the purpose of insuring the keeping qualities during shipment and storage. However, the antioxidant, when subjected to temperatures in the range of, for example, 350° F. to 395° F., will volatilize in 4 to 5 hours of such heating, leaving the cooking medium in a condition where the content of free fatty acids will rise to an undesirable extent. For example, in the active oxygen method (described in "Industrial Oil and Fat Products," by Alton E. Bailey, 1951, Interscience Publishers, Inc., New York, pages 64–65 and generally referred to as A.O.M.), the minimum A.O.M. hours that should be maintained are 23 hours and should not be allowed to go below that time interval.

One of the important objects of this invention is to provide for the replenishing of the antioxidant in proper volumes to the cooking medium as a step in the method at a point where the foreign matter-freed cooking medium passes through the system between the filtering step and before it reaches the cooking step. I have been able to maintain the minimum A.O.M. hours at 35 hours.

A major problem connected with the deep-fat frying of comestibles has been the relatively large temperature drop in hot cooking media in cooking pots upon the introduction thereto of relatively cold comestibles, both frozen comestibles, and those above freezing temperature. This problem is, of course, also present when the comestibles, at temperatures even as high as room temperatures, are introduced to the cooking media. Temperature drop and subsequent characteristic slow recovery of the cooking medium to the necessary cooking temperature, results, during the temperature drop and recovery period, in an undesirable absorption of fat by the comestibles.

Another important object of the invention is to include steps in the method which will very materially lessen temperature drop of cooking media in the cooking pot upon the introduction thereto of comestibles, at temperatures below that of the preferred temperature (such as 350° F.) of the cooking medium, and will obviate the undesirable results which follow such drop, such as referred to above.

Operators of deep fat frying equipment have been baffled when they attempted to introduce into the cooking pot a plurality of different comestibles to be cooked at the same time, because the taste or odor of one (or more) of the various comestibles tends to be transmitted to another (or more) of the other comestibles.

An important object of this invention is to provide a method of cooking more than one comestible of a kind at the same time in the cooking medium of a cooking pot without transmitting any appreciable taste or odor of one (or more) of the comestibles to another (or the other) comestible. This also obviates the need for separate deep fat fryers for frying different foods at the same time, reduces the supervision which would be required if several fryers were in operation, and reduces the upkeep, such as repairs and cleaning.

According to my method, more than one comestible may be successfully processed at the same time in the cooking medium within the same cooking zone. For example, I have successfully fried, at the same time, the following foods in one basket in the oil of a cooking pot of a so-called restaurant fryer size, with the oil maintained at a temperature of 350° F. during the cooking time: potatoes (to provide french fries), onion rings, shrimp, veal cutlet and fish sticks. Taste panel tests repeatedly proved no appreciable transfer of one food taste to any other of the foods. Primarily this is made possible by the specific circulation of the cooking medium in the cooking not during frying.

Other objects and advantages of this invention will be apparent during the course of the following detailed description thereof, taken in connection with the accompanying drawing, forming a portion of this disclosure.

In the drawing there is shown, by way of illustration, a preferred embodiment of an apparatus for carrying out the method, assisted by manual manipulation, and in this drawing.

Figure 1:
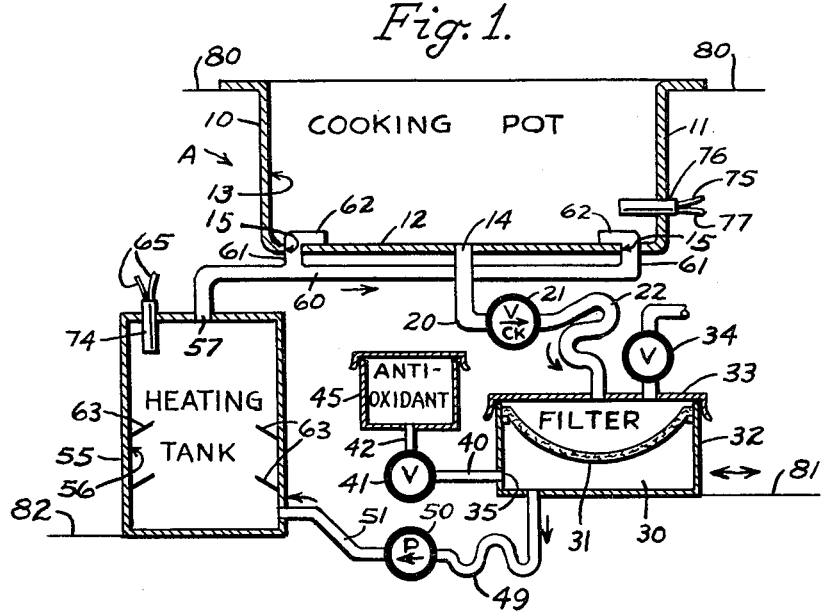
FIG. 1 is a schematic showing of the various parts of the apparatus or system, exclusive of certain electrical components.

The apparatus or system A illustrated, by way of example, generally diagrammatically, as one for carrying out my method, includes (as shown in FIG. 1) a cooking pot 10, having an upstanding wall 11 and bottom wall 12, defining a cooking zone 13, open at its upper end. The bottom wall 12 is provided, preferably at its center, with an outlet or exit port 14, and preferably two openings 15 disposed adjacent diagonally opposite corners of the cooking pot, the function of which will be referred to later. There is also a suitable opening in the wall 11 to receive a portion of a housing of a thermostat 76 to be later described. This last mentioned opening is preferably adjacent the bottom wall 12 and between, but quite remote from, the openings 15.

In addition, the system or apparatus A preferably includes a conduit 20 opening to the outlet or exit port 14 and extending downwardly therefrom opening to one side of a check valve 21 with a preferably flexible tubing 22 opening to the other side of the check value, which check valve is constructed and arranged to permit flow of oil from the conduit 20 to the conduit 22 but prevent back flow thereof. The conduit 20, flexible tubing 22 and check valve 21 define a contaminated oil passageway from the cooking zone 13 to a filtering zone 30 to be next described.

The filtering zone 30 may be defined by a filter 31 and filter housing 32 of any approved type, but I prefer a bag-type filter medium of flexible foraminous sheet material, provided with a plurality of foreign matter retaining fibres, such as the fabric known as osnaburg. The filter housing is provided with a removable closure 33 having an opening with which the interior of the tubing 22 is in communication, and may support an exhaust valve 34. This may be manually operable. The filter may be conventionally removably supported within the filter housing. One wall of the filter housing is provided with an inlet port 35 preferably below the horizontal plane of the filter, and this exit port is in communication with the lower end of a preferably rigid tubing 40, opening at its other end into the housing of a metering valve 41, which is preferably of the needle valve type manually adjustable as to flow, and to which is operatively connected, as by a rigid tubing 42, to the interior or a reservoir 45 for a suitable anti-oxidant, such as one described in "Industrial Oil and Fat Products," by Alton E. Bailey, New York, Interscience Publishers, Inc., 1951, pages 30–34, 54, and 59–64. The tubings 40 and 42 and valve 41 define an antioxidant flow passageway, while the reservoir 45 defines an antioxidant-containing zone. Opening into the bottom of the filter housing is one end of a second flexible tubing 49. The two flexible tubings 22 and 49 permit moving of the filter housing (as indicated by the double-headed arrow in FIG. 1) from one position, which the filter housing occupies while in operation, to a position where it may be uncovered and the filter 31 removed with its filtered-out foreign matter and replaced by another filter or a recleaned filter substituted, the closure 33 replaced and the filter moved to its operative position (as beneath the cooking pot 10).

The other end of the tubing 49 opens into the intake side of a conventional rotary pump 50, with the output side of the pump in communication with a conduit 51 opening into the lower end portion of a heating tank or reservoir 55. The housing of the pump 50 defines a pumping zone, while the conduit 51 defines a passageway between the pump and heating zone 56 which latter is defined by the heating tank or reservoir 55.

The heating tank or reservoir 55 of the system or apparatus A, is provided with a closed housing with an exit port 57 in its top wall and having also a thermostat housing-accommodating opening.

From the port 57 extends a conduit 60 which may be provided with two lateral conduits 61 in communication with the two openings 15, in the cooking pot 10. Within the latter are two nozzles or jets 62 with their mouths facing inwardly so as to eject the hot cooking medium into the cooking medium contained in the zone 13, in counterclockwise directions as may be appreciated from FIG. 3, and will be more fully explained later. The conduits 60 and 61 and nozzles or jets 62 define a hot cooking medium passageway.

Baffle means may be provided in the heating tank or reservoir 55 in order to insure an upwardly spiralling or circular path of the incoming cooking medium. This means may take the form of a plurality of spaced-apart plates 63, secured at their lower edges to the side wall of the tank or reservoir 55 and projecting upward and inwardly.

Figure 2:
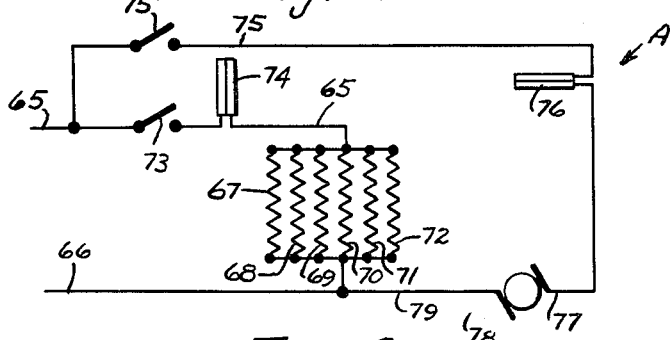
FIG. 2 is an electrical wiring diagram of the apparatus or system.

Referring now to FIG. 2, an electric wiring diagram for the system or apparatus A is shown by way of example.

In FIG. 2, the power line conductors 65 and 66 are in circuit with a plurality (as six), by way of example, of electric heating units 67–72 with a manually operated electric switch 73 and thermostat 74 interposed in the conductor 65. The units 67–72 may be arranged in any approved manner about the heating tank or reservoir 55 in order to heat the fat therein, and may comprise but one heating unit. They are preferably arranged with their longitudinal axes substantially horizontal. The thermostat 74 must be one which is exceedingly quick acting in response to temperature changes. I prefer the differential expansion thermostat embodied in U.S. Letters Patent 2,267,990, dated Oct. 7, 1941, taken with U.S. Letters Patent 2,090,407, dated Aug. 17, 1937, and 2,185,433, dated Jan. 2, 1940. What is required is a thermostat which will function upon a change of 1° F., or less. The housing of the thermostat 74 extends through the opening mentioned in the wall of the heating tank or reservoir 55 and into the heating zone 56.

From the conductor 65 extends a lead 75 in operative electrical connection with a thermostat 76, the housing of which extends through the opening mentioned in the wall 11 of the cooking pot and into the cooking zone thereof. It is essential that this thermostat 76 be of the type heretofore described in connection with the thermostat 74.

The thermostat 76 is electrically connected with a lead 77 which is, in turn, electrically connected to the windings of an electric motor 78 which motor is operatively connected with the pump 50. A lead 79, electrically connected with the windings of the motor 78 extends to the conductor 66. Interposed in the lead 75 may be an electric switch 75'.

Of course, the apparatus or system A includes a suitable housing having walls such as the walls 80, 81 and 82 (shown diagrammatically in FIG. 1) for supporting the cooking pot; slidably supporting the filter 31, supporting the pump, heating tank 55, the electrical wiring and the electric motor 78, so that the system or apparatus may be compactly associated and will occupy a minimum of space.

Since cooking media for deep fat frying are well known to those practicing the art, I will not go into details as to the many kinds of oils and fats useful as cooking media. For example, many of these are described in "Industrial Oil and Fat Products," by Alton E. Bailey, New York, Interscience Publishers, Inc., 1951. While modern cooking media include, as by an added ingredient, a suitable antioxidant (and are now required to contain such ingredient under the U.S. Food and Drug Administration regulations) it has been discovered that such additives, when subjected to temperatures around 350° F. to 395° F., will tend to volatilize in 4 to 5 hours. As a result, it is necessary to add antioxidant continuously in order to bring the antioxidant content up to that required by the so-called active oxygen method (heretofore referred to and described in "Industrial Oil and Fat Products," by Alton E. Bailey, New York, Interscience Publishers, Inc., 1951, pages 64–65) and thus prevent increase of the free fatty acid content of the cooking medium. By my method, the antioxidant is added (in order to replenish its loss as mentioned above) during every flow cycle of the cooking medium through the apparatus or system A. The time of such condition is preferably immediately after filtration of the cooking medium and when the latter is below 350° F. The metering valve 41 is preferably of the needle valve type, with a suitable control inductor with an 0.5 gram per minute flow, and manually operable.

Considering a conventional deep-fat frying cooking pot constructed and arranged to hold 6 pounds of cooking medium to each pound of comestibles to be cooked, which is a general designation as to pot size, the cooking medium should be maintained at preferably 350° F. Introducing the comestibles which may be at −10° F., to the cooking medium in the cooking pot the temperature of the medium will drop about 90° F., and will not again reach 350° F. for a variable time interval, greater of course than the normal deep-fry cooking time for the comestibles. For example, normal deep-fry cooking time for frozen potatoes prepared for french frying is 2 minutes and 10 seconds; for frozen chicken, 8 minutes, 15 seconds; and for frozen shrimp, 3 minutes, 0 seconds. In the case of unfrozen comestibles at about room temperature, the normal deep fry cooking time is: for potatoes for french frying, 1 minute, 50 seconds; for chicken, 7 minutes, 15 seconds; and for shrimp, 2 minutes, 32 seconds. However because of the relatively high time interval before the cooking medium again reaches substantially 350° F., the comestibles absorb too much cooking medium. For example, they will absorb, of the cooking medium 7.1% to 7.8%.

On the contrary, in accordance with my process, the temperature drop under the conditions mentioned above is only about 10° F., because almost the instant the frozen comestibles are introduced to the 350° F. cooking medium and a drop in temperature commences, the thermostat 76 in the cooking pot 10 will function and the result will be an almost instantaneous surge of cooking medium at about 395° F. from the heating tank or reservoir 55 into the cooking pot, restoring the temperature of the cooking medium therein to 350° F., whereupon the thermostat 76 will function to open the electric circuit to the electric motor 78, stopping operation of the pump 50 and the surge of hot cooking medium at 395° F. will cease, so that the cooking medium in the cooking pot will not overheat. Neither will the cooking medium absorption be at all as high as stated above, for the absorption, employing my method, will be about 3.9%. By my method, considering, as a typical example, taking into consideration the conditions referred to in the last above paragraph, and the flow of antioxidant mentioned (0.5 gram per minute flow), I have been able to keep the minimum A.O.M. to 35 hours (as compared to the average 25 hours).

Figure 3:
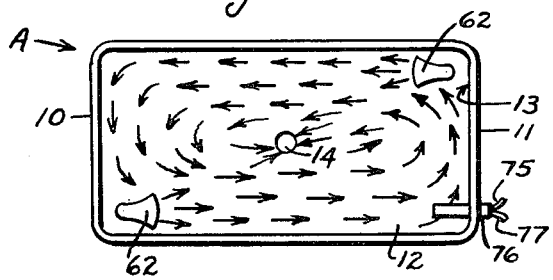
FIG. 3 is a schematic top plan view of the cooking pot of the apparatus and illustrating, by arrows, substantially the preferred paths of the flow of a cooking medium therein.

The cooking medium circulatory system of my invention is indicated as being substantially as shown in FIG. 3. That is, the hot cooking medium enters the cooking zone 13 (cooking pot 10) through outlets, such as the nozzles or jets 62 disposed inwardly of and adjacent preferably two opposite corners of the pot. The nozzles are preferably somewhat fan-shaped, with the longitudinal axes of their mouths being substantially horizontal, paralleling each other, and slightly above, the bottom wall 12 of the cooking pot. The nozzles 62 are so positioned that the jets surging from them set up or impart a counterclockwise motion and circulatory path to the hot cooking medium, whereby the paths of the latter are such that they positively extend through the usual wire baskets when placed within the cooking pot and through the interstices between the comestible portions within the baskets. It should be borne in mind that the temperature of the cooking medium within the pot is the proper cooking temperature for the comestibles but that, when the latter are introduced to the hot cooking medium, the temperature of the latter will drop and this drop will cause the thermostat 76 to operate almost instantly, whereby hot cooking medium from the heating zone or reservoir tank 55 will jet or surge into the cooking zone 13 and set up the circulatory movement referred to above. Even after the temperature of the cooking medium within the cooking zone 13 is restored to its proper cooking degree and jetting of cooking medium through the nozzles cease, the circulatory path will continue for a time due to the circulatory momentum imparted to the cooking medium.

Of course, the positions of the nozzles 62 provide for the additional important function referred to above. That is, a sweeping of foreign matter from the interstices between the comestible portions within the baskets takes place, and this foreign matter, together with that upon the inner surface of the bottom wall of the pot 10, will be swept into the exit port 14 and, will pass to the filtering zone 30, to be filtered off.

As has been stated herein, I employ no so-called filter aid (such as fuller's earth) as I have discovered that a material, such as osnaburg with its plurality of fibres extending in the interstices of the fabric, will filter the foreign matter from the cooking medium, yet the entrained foreign matter will not adhere to the fibres in such a way as to close the interstices.

I have discovered that the reserve temperature of 45° F. between that of the proper cooking temperature (350° F.) of the cooking medium in the cooking zone 13 and the preferred temperature (395° F.) of the medium in the heating zone is critical in order to have heated cooking medium in the heating zone sufficient to immediately step up the temperature of the cooking medium when the temperature of the latter is lowered upon the introduction of comestibles. The other factor is, of course, to be able to heat quickly the cooking medium flowing into the heating zone even when there may be a sudden large drain upon the medium therein (as when a large bulk of comestibles of very low temperature is suddenly introduced into the cooking medium of the cooking zone).

Referring now to the preliminary steps in the method of cooking comestibles by the immersion or introduction of the comestibles of varying temperatures, ranging from room temperatures to −10° F., and requiring varying time periods for cooking at the necessary temperatures for proper cooking, these steps preferably comprise:

(1) Introducing antioxidant to the reservoir 45. This may be accomplished by manually drawing out the filter housing 32 until the closure of the reservoir 45 can be removed, the antioxidant introduced, the closure replaced and the filter housing slid back, after opening the valve 34.

(2) Upon closing of the electric switch 75' in the lead 75, electric current will flow through the lead 75, the closed switch of the thermostat 76 (set to an attained temperature of 350° F.), lead 77, windings of the electric motor 78 and lead 79, starting the pump 50 in operation, and cooking medium introduced to the cooking pot 10, flowing through the exit 14, conduit 20, check valve 21, flexible tubing 22, filter 31, flexible tubing 49, pump 50, conduit 51 and into the heating tank or reservoir 55 to fill the latter. The valve 34 may be closed after the cooking medium flow has commenced.

(3) The electric switch 73 is now closed and electric current will flow through the switch of the thermostat 74 (set to an attained temperature of 395° F.), through the heating units 67–72 and lead 66, energizing the coils for heating the cooking medium.

(4) Continuing to introduce more cooking medium into the cooking pot until agitation of the cooking medium in the pot indicates that the cooking medium is being ejected from the nozzles 62.

At a suitable time, the valve 41 is set to meter antioxidant from the antioxidant reservoir 45 into that portion of the cooking medium in the lower part of the filter housing 32. When the cooking medium in the heating tank or reservoir 55 reaches a temperature of 395° F. the thermostat 74 will function to open the circuit in which it is interposed but will permit the flow of electricity to the heating units 67–72 when the cooking medium in the heating tank 55 drops even 1° F. When the cold cooking medium, introduced into the cooking pot, is heated to 350° F., by the incoming cooking medium from the heating tank or reservoir 55, the thermostat 76 will function to open the circuit to the electric motor 78 and pumping will cease, but pumping will resume upon a drop of only 1° F. in the temperature of the cooking medium in the cooking pot, which will cause almost instantaneous functioning of the thermostat 76.

Now with reference to the subsequent steps in my method:

(5) With the cooking medium in the cooking zone 13 (defined by the walls 11 and 12 of the cooking pot 10) at 350° F., and of a volume sufficient to cook the comestibles to be introduced thereinto, the comestibles, preferably contained in baskets (not shown but such as of the conventional construction well known in the deep-fat frying art) are preferably manually introduced to the cooking medium in the cooking zone. Obviously the comestibles will be at temperatures below 350° F., and their temperatures will cause a drop in the temperature of the cooking medium in the cooking zone.

(6) Almost instantly the thermostat 76 will function to start operation of the electric motor 78 and pump 50, which will draw a volume of the cooking medium from the cooking zone and cause injection of a corresponding volume of the 395° F. cooking medium from the heating zone into the cooking zone. At the same time, the now cooler cooking medium flowing into the heating zone will cause a drop in the temperature in that zone, the thermostat 74 will almost instantly function and cause the heating units 67–72 to be energized until the cooking medium in the heating zone or tank 55 reaches a temperature of 395° F. The introduction of the cooking medium from the heating zone into the cooking zone will cause the circulatory circulation described within the cooking zone 13, whereby (a) foreign matter will be carried from the interstices between the comestibles and from the inner surface of the bottom wall 12 and into the exit port 14 and thence to the filtering zone, via the contaminated cooking medium passageway (conduit 20, check valve 21 and flexible tubing 22) and (b) the circulation mentioned under (a) will cause the cooking medium to reach even the innermost part of the body of comestibles (as in the basket) and proper cooking thereof will be substantially equal to that of the comestibles which are outwardly of the innermost part of this body. In the event one basket of comestibles within the cooking zone is, for example, potatoes processed for French fries, and another basket within the cooking zone contains, for example, chicken, it is not necessary for the operator to keep his attention on temperature readings and time readings, but simply to concentrate on the time factor for withdrawing a basket. (c) As has been stated above I have discovered that my circulatory step does not cause tastes or odors of one comestible to be transmitted to a dissimilar comestible cooking, at the same time, in the cooking zone.

(7) The operator will, of course, keep track of the cooking time factor, using a clock, or a signal device of any appropriate kind, and removed the cooked comestibles at the end of the proper time interval. This may call for the removal of one of two baskets at one time interval and the other basket at a longer time interval.

The step of removing the foreign matter retained by the filter 31 may be undertaken at any desirable time when the pump 50 is not in operation, by drawing the filter housing 32 outwardly, removing the closure 33, removing the filter medium and replacing it by another.

I have discovered that, considering my apparatus as an example, and a variety of comestibles having been fried, including comestibles having a breaded covering, the filter should be removed after about 8 hours of operation. In cooking potatoes for french fries, the filter should be removed, by way of example, after about 12 hours of operation.

Where I have referred to percentages of cooking medium being absorbed by comestibles in conventional deep fat cooking methods, I mean percentages by weight.

Various changes in the size, shape and arrangements of parts may be made to the form of invention shown herein without departing from the spirit of the invention or scope of the claims.

What is claimed is:

1. The method of deep-fat cooking comestibles in a cooking zone, comprising the steps of: providing a cooking zone with a body of cooking oil at a predetermined cooking temperature; introducing into said cooking oil comestibles having a temperature customarily lying between about room temperature and about −10° F., whereupon the temperature of said cooking oil will drop below that of said predetermined cooking temperature; immediately introducing additional cooking oil into said cooking zone at a predetermined temperature substantially higher than said predetermined cooking temperature, while withdrawing a corresponding amount of cooking oil from said cooking zone and reheating the same to said higher predetermined temperature; continuing such addition, withdrawal and reheating of said cooking oil as required until the temperature of the cooking oil in said cooking zone is restored and maintained substantially constant at said predetermined cooking temperature, whereby the cooking time is shortened to a minimum and absorption of the cooking oil by the comestibles is also reduced to a minimum; and removing said comestibles from said cooking zone, when cooked.

2. The method of deep-fat cooking comestibles in a cooking zone, comprising the steps of: providing a cooking zone with a body of cooking oil at a cooking temperature of about 350° F.; introducing into said cooking oil comestibles having a temperature customarily lying between about room temperature and about −10° F., whereupon the temperature of said cooking oil will drop below that of said cooking temperature; immediately introducing additional cooking oil into said cooking zone at a higher temperature of about 395° F. while withdrawing a corresponding amount of cooking oil from said cooking zone and reheating the same to said higher temperature; continuing such addition, withdrawal and reheating of said cooking oil as required until the temperature of the cooking oil in said cooking zone is restored and maintained substantially constant at said cooking temperature of about 350° F., whereby the cooking time is shortened to a minimum and absorption of the cooking oil by the comestibles is also reduced to a minimum; and removing said comestibles from said cooking zone, when cooked.

3. The method of deep-fat cooking comestibles in a cooking oil, comprising: providing a continuous circulating system for the cooking oil including a comestible cooking zone in which cooking oil is to be maintained at a predetermined substantially constant cooking temperature, and a cooking oil heating zone connected thereto, in which the cooking oil is heated to a predetermined temperature substantially higher than said predetermined cooking temperature; introducing enough cooking oil into said system to completely fill said heating zone and partially fill said comestible cooking zone; circulating the cooking oil through said system by withdrawing cooking oil at a lower temperature than said predetermined cooking temperature from said comestible cooking zone and forcing the same into said filled heating zone to displace from said heating zone and introduce into said cooking zone a volume of cooking oil equal to that withdrawn from said cooking zone; continuing said circulation until the cooking oil in said cooking zone reaches said predetermined cooking temperature; introducing comestibles at a lower temperature than said predetermined cooking oil temperature into the cooking oil in said cooking zone, thereby producing a drop in temperature of the cooking oil in said cooking zone; immediately resuming circulation of said cooking oil and continuing the circulation as required to maintain said cooking oil in said cooking zone at said predetermined substantially constant cooking oil temperature, whereby the cooking time is shortened to a minimum and absorption of the cooking oil by the comestibles is also reduced to a minimum; and removing the cooked comestibles from said cooking zone, when cooked.

4. The method defined in claim 3 including the steps of: introducing the heated cooking oil into the lower portion of the cooking zone in the form of oppositely directed streams and inducing circulation of the cooking oil already in said cooking zone in a rotary path, whereby the cooking oil is circulated about the comestibles and any foreign matter in said cooking oil is caused to settle at the lower central portion of said cooking zone; and wherein the cooking oil and foreign matter are withdrawn from said central zone to thereby keep the lower portion of said cooking zone clean; and filtering said withdrawn cooking oil prior to forcing it into said heating zone.

5. The method defined in claim 4 including the step of: adding an antioxidant to the withdrawn cooking oil before it is returned to the cooking zone.

6. The method of deep-fat cooking comestibles in a cooking oil, comprising: providing a continuous circulating system for the cooking oil including a comestible cooking zone in which cooking oil is to be maintained at a predetermined substantially constant cooking temperature, and a cooking oil heating zone connected thereto, in which the cooking oil is heated to a predetermined temperature substantially higher than said predetermined cooking temperature; introducing enough cooking oil into said system to completely fill said heating zone and partially fill said comestible cooking zone; circulating the cooking oil through said system by withdrawing cooking oil at a lower temperature than said predetermined cooking temperature from said comestible cooking zone and introducing the same into said filled heating zone to displace from said heating zone and introduce into said cooking zone a volume of cooking oil equal to that withdrawn from said cooking zone; continuing said circulation until the cooking oil in said cooking zone reaches said predetermined cooking temperature; introducing comestibles at a lower temperature than said predetermined cooking oil temperature into the cooking oil in said cooking zone, thereby producing a drop in temperature of the cooking oil in said cooking zone; continuing circulation of said cooking oil through said heating and cooking zones to maintain said cooking oil in said cooking zone at said predetermined substantially constant cooking oil temperature, whereby the cooking time is shortened to a minimum and absorption of the cooking oil by the comestibles is also reduced to a minimum; and removing the cooked comestibles from said cooking zone, when cooked.

7. The method of deep-fat cooking batches of frozen comestibles in a cooking oil, comprising: providing a continuous circulating system for the cooking oil including a comestible cooking zone in which cooking oil is to be maintained at a substantially constant cooking temperature of about 350° F., and a cooking oil heating zone connected thereto in which the cooking oil is heated to a temperature of about 395° F.; introducing enough cooking oil into said system to completely fill said heating zone and partially fill said comestible cooking zone; circulating the cooking oil through said system by withdrawing cooking oil at a lower temperature than said substantially constant cooking temperature from said comestible cooking zone and introducing the same into said filled heating zone to displace from said heating zone and introduce into said cooking zone a volume of cooking oil equal to that withdrawn from said cooking zone; continuing said circulation of cooking oil until the cooking oil in said cooking zone reaches said substantially constant cooking temperature; introducing at least one batch of frozen comestibles into the cooking oil in said cooking zone, thereby producing a drop in temperature of the cooking oil in said cooking zone; continuing circulation of said cooking oil through said heating and cooking zones to maintain said cooking oil in said cooking zone at said substantially constant cooking oil temperature, whereby the cooking time is shortened to a minimum and absorption of the cooking oil by the comestibles is also reduced to a minimum; and removing the cooked comestibles from said cooking zone, when cooked.

References Cited by the Examiner

UNITED STATES PATENTS

| | | | |
|---|---|---|---|
| 2,767,095 | 10/56 | Smith | 99—100 |
| 2,812,254 | 11/57 | Smith | 99—100 |
| 2,836,496 | 5/58 | Salvo | 99—100 |
| 2,874,055 | 2/59 | Melnick et al. | 99—100 X |
| 2,915,001 | 12/59 | Montgomery | 99—100 X |
| 3,107,601 | 10/63 | Longmire. | |

A. LOUIS MONACELL, *Primary Examiner.*

HYMAN LORD, *Examiner.*